(12) United States Patent
Berhan

(10) Patent No.: US 6,487,145 B1
(45) Date of Patent: Nov. 26, 2002

(54) METHOD AND SYSTEM FOR AUDIO DATA COLLECTION AND MANAGEMENT

(75) Inventor: Michel D. Berhan, San Jose, CA (US)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 09/389,966

(22) Filed: Sep. 3, 1999

Related U.S. Application Data

(60) Provisional application No. 60/130,841, filed on Apr. 22, 1999, and provisional application No. 60/139,921, filed on Jun. 17, 1999.

(51) Int. Cl.$^7$ .............................. G11B 7/085; G11B 7/00
(52) U.S. Cl. ............................... 369/30.15; 369/30.27; 369/124.08
(58) Field of Search ............................ 369/32, 33, 47.1, 369/47.28, 47.29, 47.3, 53.31, 6, 7, 2, 12, 30.15, 30.08, 30.04, 124.08, 30.1, 30.12, 30.27, 33.01

(56) References Cited

U.S. PATENT DOCUMENTS

| | | | | |
|---|---|---|---|---|
| 5,224,087 A | * | 6/1993 | Maeda et al. ................. | 369/54 |
| 5,408,449 A | * | 4/1995 | Oh ............................... | 369/32 |
| 5,422,868 A | * | 6/1995 | Koizumi et al. ............... | 369/32 |
| 5,430,697 A | * | 7/1995 | Bu ................................ | 369/32 |
| 5,457,669 A | * | 10/1995 | Kim et al. ..................... | 369/32 |
| 5,553,055 A | * | 9/1996 | Yokota et al. ............... | 369/124 |
| 5,610,881 A | * | 3/1997 | Park ............................. | 369/32 |
| 5,825,726 A | * | 10/1998 | Hwang et al. ................ | 369/32 |

OTHER PUBLICATIONS

"Information processing—Volume and file structure of CD–ROM for information interchange", ISO 9660: 1988 (E), pp. 1–31, International Organization for Standardization, Switzerland, Sep. 1988.

\* cited by examiner

Primary Examiner—Tan Dinh
(74) Attorney, Agent, or Firm—Martine & Penilla, LLP

(57) ABSTRACT

A method is provided for extracting music data from a compact disc and managing the music data. The method is configured to have the system extract at least a portion of an initial track of music data at an extracting rate that is greater than the listening rate. The system simultaneously writes the extracted portion of the initial track of music data to a storage media at the extracting rate while performing the extracting. Meanwhile, a user may listen to at least a portion of the extracted portion of the initial track of music data from the storage media at the listening rate.

8 Claims, 14 Drawing Sheets

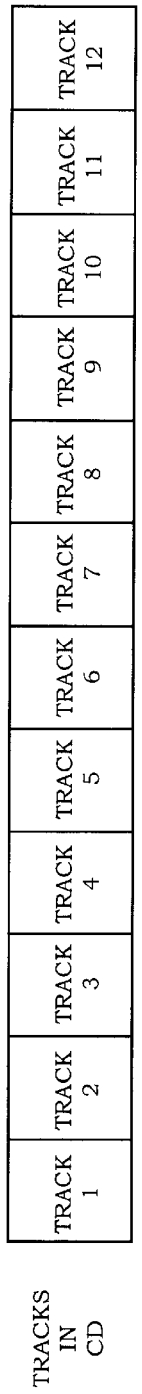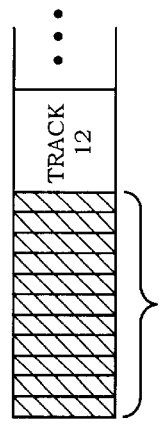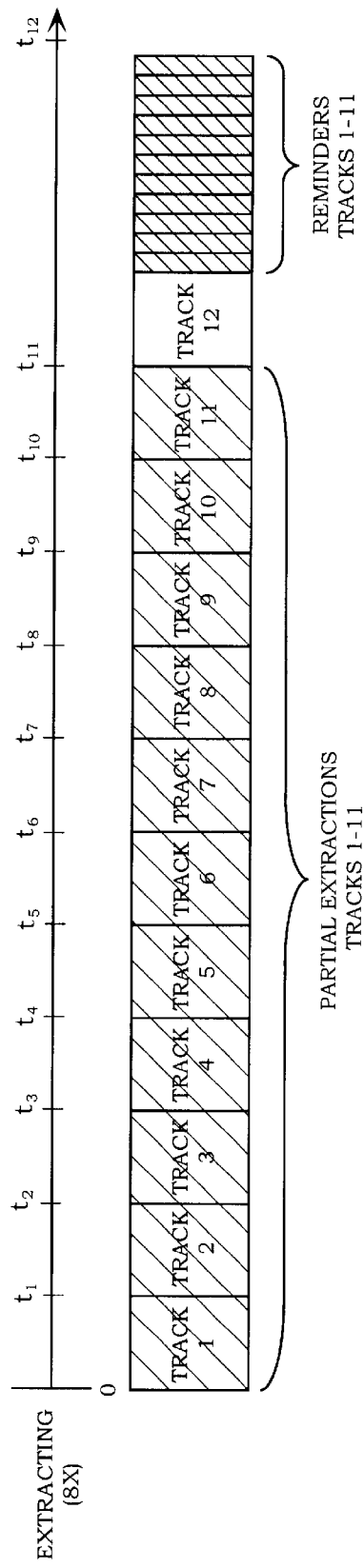
FIG. 9

METHOD AND SYSTEM FOR AUDIO DATA COLLECTION AND MANAGEMENT

CROSS REFERENCE TO RELATED APPLICATIONS

This application claims priority from U.S. Provisional Patent Application No. 60/139,921, field Jun. 17, 1999 and No. 60/130,841, filed Apr. 22, 1999, and entitled "Audio Data Collection and Management." This provisional application is herein incorporated by reference.

BACKGROUND OF THE INVENTION

1. Field of the Invention

This invention relates generally to digital audio equipment and, more particularly, to software for computer systems and digital audio equipment used in audio stereo systems.

2. Description of the Related Art

Many home and car stereo systems are equipped with devices for playing digitally recorded media. Such devices may include compact disc (CD) players, digital video disc (DVD) players, and mini disc players. In a conventional stereo system, a CD player may be substituted for a compact disc (CD) changer.

FIG. 1 shows a conventional car stereo system. The system includes a head unit 10, a CD changer 14, speakers 16, and a power supply 12. The head unit 10 includes the control display for the system and is typically mounted into the dashboard of a car. The CD changer 14 is typically mounted in the trunk of the car. The speakers 16 are mounted at desired locations, typically two in the front and two in the back of the car's interior. The system is powered by the power supply 12, which is typically the car battery. The CD changer 14 allows the convenience of loading multiple CD's in the CD changer 14. The user can thereby listen to several CD's without the inconvenience of reloading every time a different CD is desired. CD changers in car stereo systems typically allow the user to load between 3 and 10 CD's.

Unfortunately, the conventional stereo system of FIG. 1 has some disadvantages. Designers of CD changers are, for example, faced with the challenge of designing CD changers that will not "skip" during CD playback. Because CD changers use lasers having high precision reading accuracy, skipping may occur during playback due to any jolt to the system caused by adverse road conditions.

Another disadvantage of the conventional stereo system is the inconvenience of unloading an old set of CD's and loading a new set of CD's. Many users may not want to replace the CD's in the CD changer every time a different set of CD's is desired. Many users may find it more convenient, yet less desirable, to simply keep old CD's in the CD changer rather than change the old CD's for a new set.

In view of the foregoing, what is needed is a car stereo system that will allow the storage of more CD's without the inconvenience of constantly having to unload and load CD's, like in the conventional car stereo system. There is also a need for providing skip-free playback on such a system.

SUMMARY OF THE INVENTION

Broadly speaking, the present invention fills these needs by providing a method for loading music data from a multitude of CD's into a storage media for future listening, thus, eliminating the need for a conventional CD changer. It should be appreciated that the present invention can be implemented in numerous ways, including as a process, an apparatus, a system, a device or a method. Several inventive embodiments of the present invention are described below.

In one embodiment, a method is provided for extracting music data from a compact disc and managing the music data. The method is configured to have the system extract at least a portion of an initial track of music data at an extracting rate that is greater than the listening rate. The system simultaneously writes the extracted portion of the initial track of music data: to a storage media at the extracting rate while performing the extracting. Meanwhile, a user may listen to at least a portion of the extracted portion of the initial track of music data from the storage media at the listening rate.

In another embodiment, a computer readable media is disclosed that has program instructions for extracting music data from a compact disc and managing the music data. The program instructions include instructions for extracting at least a portion of an initial track of music data at an extracting rate that is greater than the play back rate. There are also instructions for writing at least the portion of the initial track of music data to a storage media at the extracting rate while performing the extracting. Additionally, there are instructions for playing back at least a portion of the initial track of music data from the storage media at the play back rate.

In still another embodiment, a method for extracting music data from a compact disc and managing the music data is disclosed. The method is configured to have the system extract at least a portion of an initial track of music data at an extracting rate that is greater than a fast forwarding rate. Simultaneously, the system writes the extracted portion of the initial track of music data to a storage media at the extracting rate while performing the extracting. Meanwhile, the system fast forwards at least a portion of the extracted portion of the initial track of music data from the storage media at the fast forwarding rate.

In another embodiment, an automobile audio system is disclosed. The system includes a control panel for displaying audio data and a control unit that is wired to the control panel. The control unit includes: (a) a hard disk; (b) a compact disc playing unit, the compact disc playing unit is capable of playing at least one compact disc; (c) interface circuitry that enables the wiring of the control unit to the control panel; (d) a processor and memory that are connected to the interface circuitry, where the memory is configured to store program instructions for extracting music data from the compact disc of the compact disc playing unit, the extracted data is stored in the hard disk, and the extracted data is capable of being managed by way of the program instructions.

The system has several advantages over conventional car stereo systems. With compressed audio, the system allows storage on a hard disk of about 160 music CD's, which is the equivalent of about 2000 music tracks. This storage capacity may easily be upgraded by replacing the hard disk with another hard disk that has more storage capacity. In effect, the system replaces a conventional CD changer, which typically can store only between 3 and 10 CD's.

For CD-R and CD-RW users, the system allows a user to play CD-R and CD-RW audio discs. The system allows playback and caching of CD's in Adaptec's CD3™ Format. The system allows synchronization of the music track title database. In addition, the system allows a user to download internet music or content and then play it on the system.

Another advantage of the system is skip-free playback. As mentioned above, conventional CD changers may skip if there is a jolt to the system due to adverse road conditions. Because this system uses hard drive technology, as opposed to CD technology for playback, the system provides more stability than conventional CD changers. Still another advantage is that the system extracts and caches the CD data in near perfect digital quality, with a relatively small amount of data loss due to compression. In other words, the hard disk records practically without any data loss during transmission because the system records from a digital CD to a digital hard disk. The bottom line result of this near perfect extraction and caching is a user being able to listen to music with CD quality playback without having to juggle a multitude of CD's.

Other aspects and advantages of the present invention will become apparent from the following detailed description, taken in conjunction with the accompanying drawings, illustrating by way of example the principles of the present invention.

BRIEF DESCRIPTION OF THE DRAWINGS

The present invention will be readily understood by the following detailed description in conjunction with the accompanying drawings. To facilitate this description, like reference numerals designate like structural elements.

FIG. 9 shows how the system can extract data from a CD having 12 tracks while a user listens to initial portions of tracks 1 through 11, in accordance with one embodiment of the present invention.

DETAILED DESCRIPTION OF THE PREFERRED EMBODIMENTS

An invention is described for a method and system for extracting, listening, managing, and retrieving audio data for use with an audio stereo system. The method may be implemented in a computer system, an automobile stereo system, a home stereo system, or a combination thereof. It will be apparent, however, to one skilled in the art that the present invention may be practiced without some or all of these specific details. In other instances, well known process operations have not been described in detail in order not to unnecessarily obscure the present invention.

Figure 1:
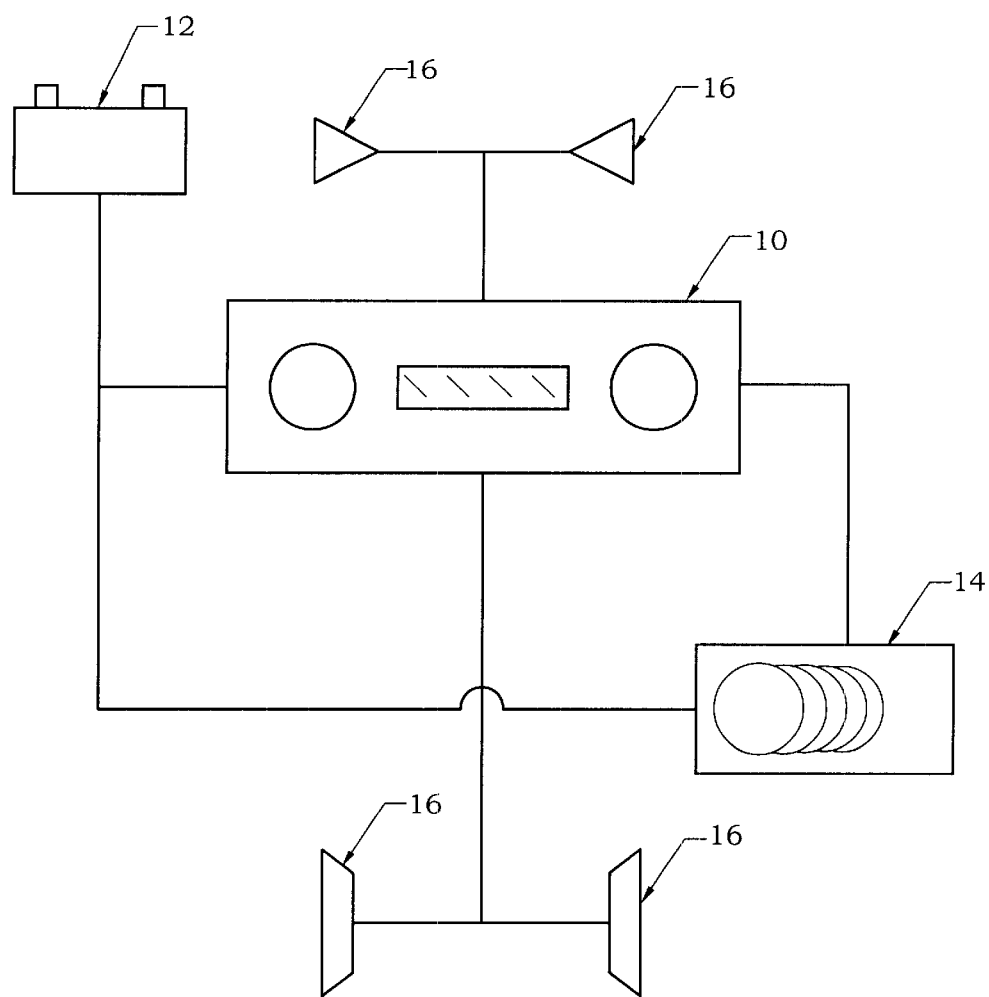
FIG. 1 shows a conventional car stereo system.
Figure 2A:
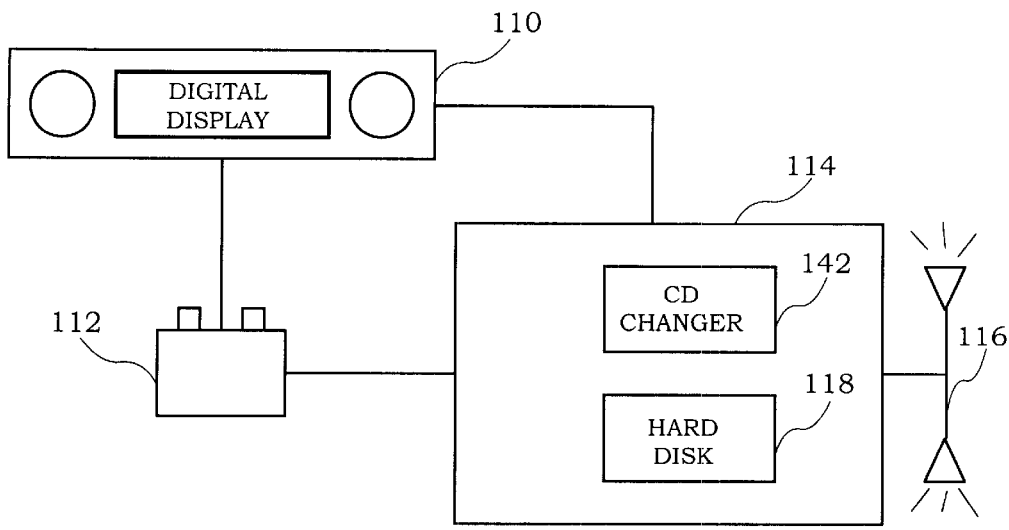
FIG. 2A shows a schematic diagram of a car stereo system, in accordance with one embodiment of the present invention.

FIG. 2A shows a schematic diagram of a car stereo system, in accordance with one embodiment of the present invention. The system includes a control panel 110, a control unit 114, a sound system 116, and a power supply 112. The control panel 110 has a digital display and is preferably mounted into a dashboard of a car. The control unit 114 may contain a removable CD changer cartridge 142 and a removable hard disk cartridge 118. Note that instead of a CD changer cartridge 142, the system may be implemented with a single CD player (not shown), or some other CD playing device. The convenience of having a removable hard disk cartridge 118 is that the user can insert the removable drive in another car or simply use it in a home stereo system unit or in connection with a personal computer.

For space convenience, the control unit is preferably mounted in the trunk, although, other locations (e.g., the space between the two front seats) may also work. The sound system 116 is mounted at desired locations in the automobile. The system is powered by the power supply 112, which is preferably the car battery. A voltage regulator (not shown) connected to the power supply 112 ensures clean power to the unit. When the car is turned off, the system preferably goes into a low power suspend mode. The suspend mode allows, among other things, the system to remember where the user left off during a given playback of desired music tracks.

Figure 2B:
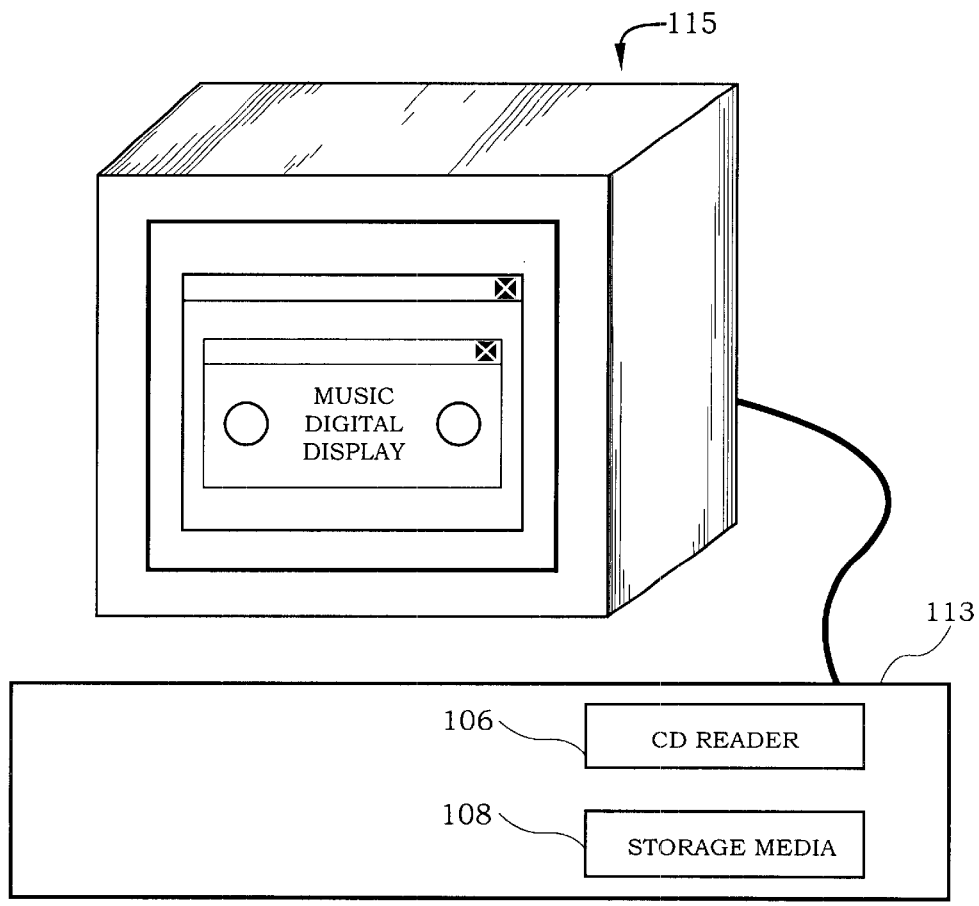
FIG. 2B illustrates an example personal computer system, which can process program instructions for enabling listening and recording of audio data in the aforementioned CD3 format, in accordance with one embodiment of the present invention.

FIG. 2B illustrates an example personal computer system 115, which can process program instructions for enabling listening and recording of audio data in the aforementioned CD3 format, in accordance with one embodiment of the present invention. Accordingly, the computer system 115 includes a computer unit 113. The computer unit 113 can be configured to enable listening of music via a CD reader 106 (e.g., a CD-ROM drive) and simultaneous extraction to a storage media 108 (e.g., a hard disk) of the computer unit 113. As will be described in greater detail below, the extraction and listening techniques enable users to simply listen to a few songs while the audio data is extracted and stored digitally to the storage media, which can be a standard hard drive. Therefore, although specific examples are directed toward use of this system in connection with automobile stereo systems, the techniques are fully applicable to personal computers.

Figure 3:
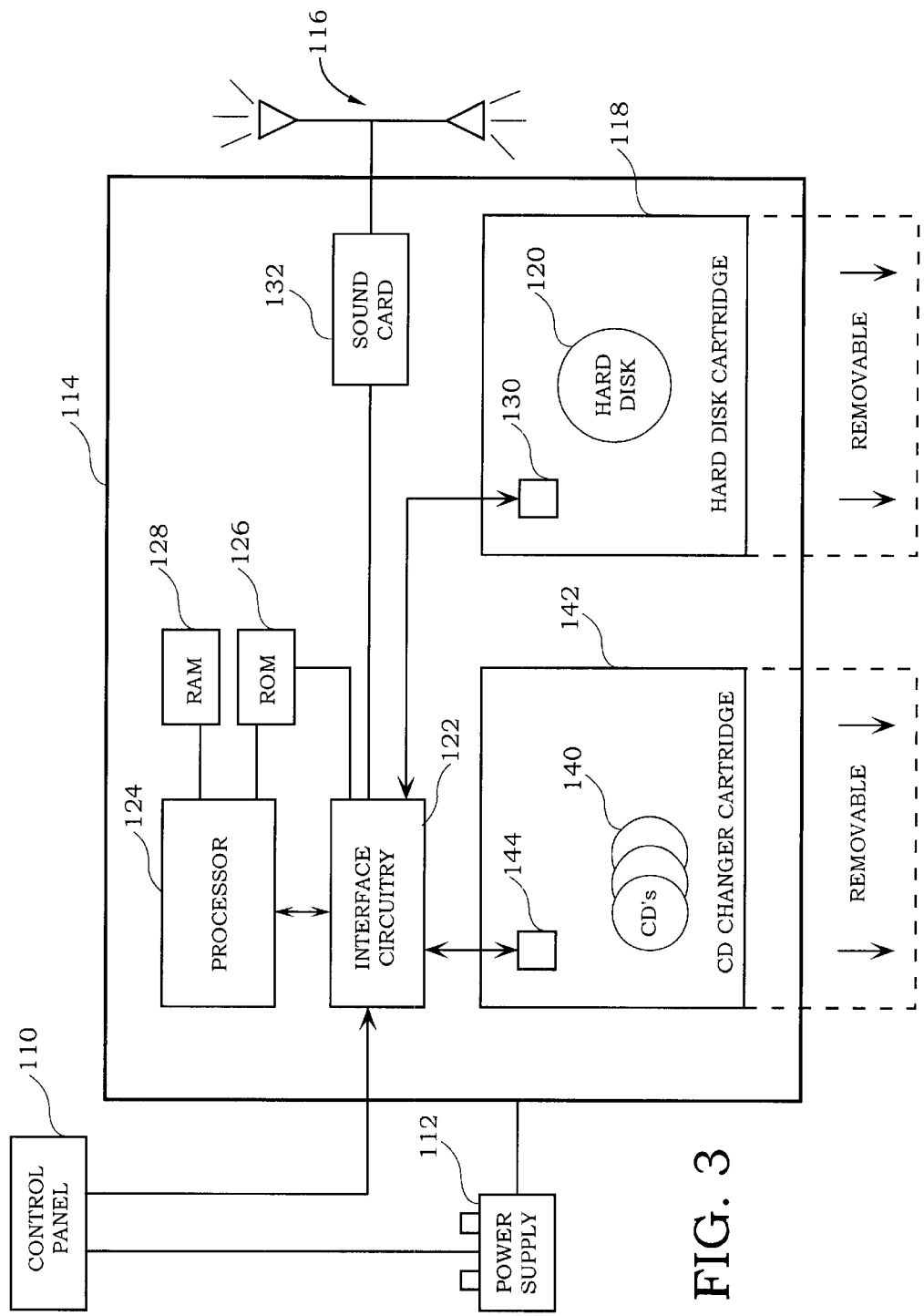
FIG. 3 shows a more detailed view of the control unit 114 of FIG. 2, in accordance with one embodiment of the invention.

FIG. 3 shows a more detailed view of the control unit 114, in accordance with one embodiment of the invention. The removable hard disk cartridge 118 includes a hard disk 120 and hard drive circuitry 130. The removable CD changer cartridge 142 can include CD's 140, and CD changer circuitry 144.

Interface circuitry 122 is configured to interact with the control panel 110 and the software stored on a ROM 126 or the hard disk 120. The interface circuitry 122 also provides a communication link between the hard drive circuitry 130, the CD changer circuitry 144, and the control panel 110. A processor 124 can then communicate with and execute software instructions that may be stored on ROM 126. RAM 128 is configured to provide the processor 124 with a suitable amount of memory to complete processor intensive tasks. For instance, the processor 124 can handle data computations for the control unit 114 and can interact with the interface circuitry 122. The control unit 114 is powered by the power supply 112. The interface circuitry 122 can thus communicate with a sound card or chip 132 that will link to the sound system 116.

When use is designed for an automobile, the control unit 114 can contain a 4 gigabyte rugged IDE hard drive which has low power and low noise capabilities. Alternatively, the hard drive of a personal computer can be of any size, and additional hard drives can be implemented as is well known. The system preferably utilizes a high quality MP3encoder/decoder, which may be implemented by either hardware or software. Besides MP3, the system may alternatively utilize another type of encoder/decoder that is compatible with this audio extraction system. For instance, the encoder/decoder may be an Adaptec CD3™ encoder/decoder, the details of which were previously incorporated herein by reference.

Figure 4:
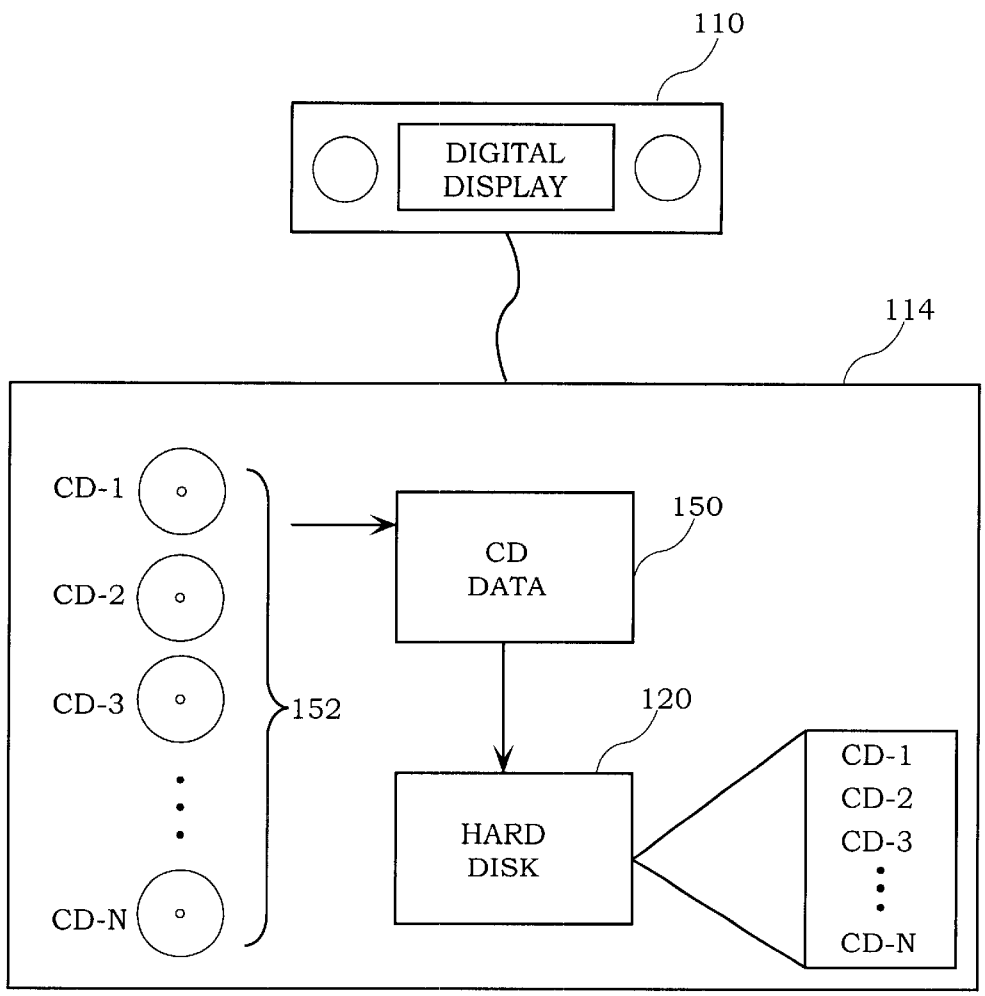
FIG. 4 shows how a user may store CD data into a hard disk by inserting one of the CD's into a CD changer, in accordance with one embodiment of the present invention.

As illustrated in FIG. 4, a user stores CD data 150 into the hard disk 120 by inserting one of the CD's 152 into a CD changer 142 (shown in FIG. 3). CD data may be extracted from the CD's 152 that are in the CD changer 142, which is in the control unit 114. The system, for example, extracts CD data 150 from CD-1 and caches the CD data 150 onto the hard disk 120 for future listening while simultaneously allowing a user to listen to any track of CD-1. In one embodiment, the extraction time for a typical audio CD may be about 6 minutes. If the storage capacity of the hard disk 120 is N CD's, then a user can repeat this extraction and caching process from CD-1 through CD-N. In one specific embodiment, the speed of extraction can be about 8 times the speed of playback. That is, extraction can be done at 8× or greater, while playback is set at 1×.

Figure 5:
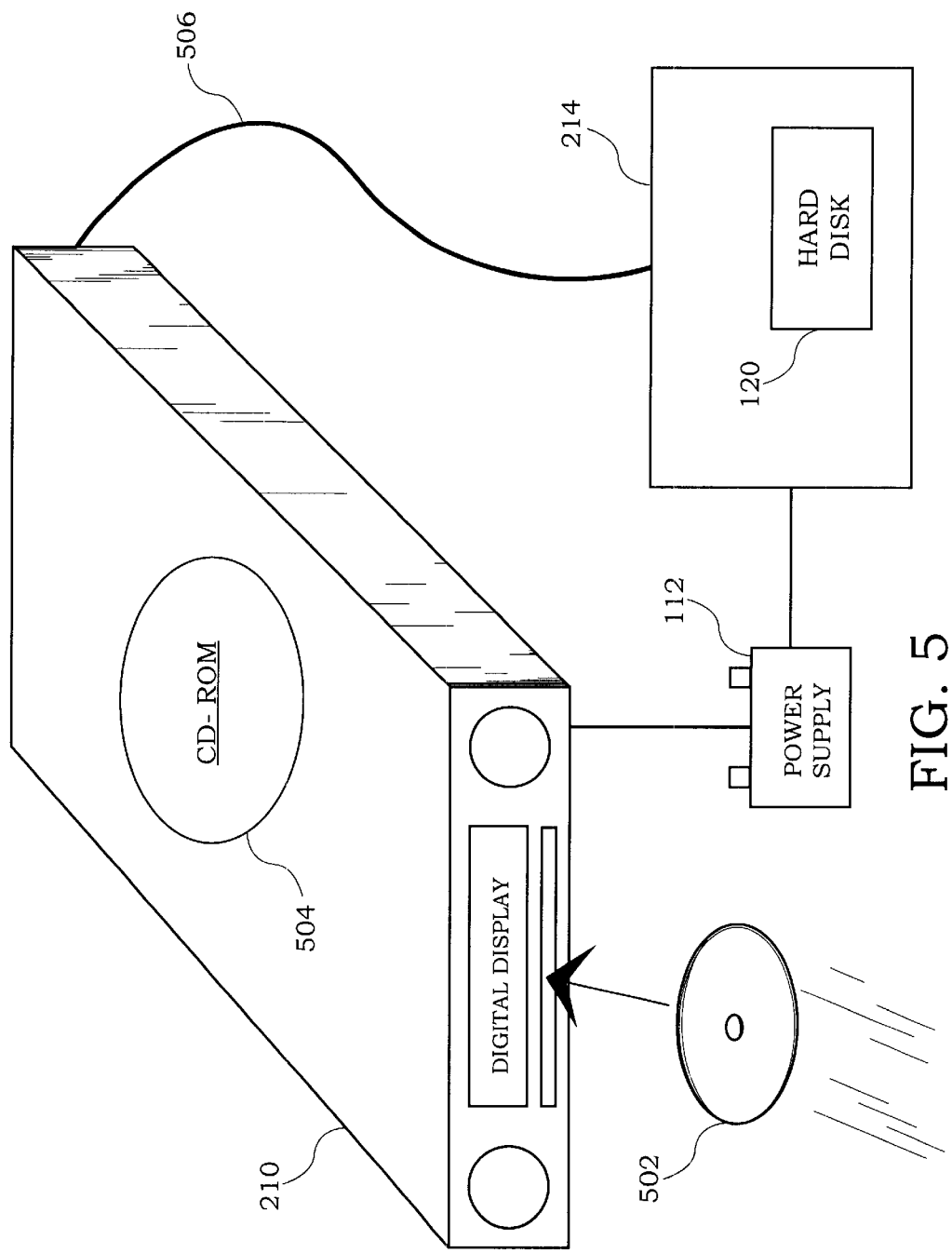
FIG. 5 shows a schematic diagram of a car stereo system where the control panel includes a multi-read CD-ROM drive, in accordance with an alternative embodiment of the present invention.

FIG. 5 shows a schematic diagram of a car stereo system where the control panel 210 includes a multi-read CD-ROM drive 504, in accordance with an alternative embodiment of the present invention. The system also includes a control unit 214, a sound system 116, and a power supply 112. The control panel 210 has a digital display and is preferably mounted into a dashboard of a car.

In this embodiment, because the CD-ROM is incorporated into the control panel 210, a CD changer in the control unit 214 is unnecessary. In effect, the CD-ROM drive 504 in the control panel 210 fills a need of having the CD changer in the control unit 214. In this manner, a user inputs a desired CD 502 directly into the control panel 210, as opposed to inserting the CD 502 into a CD changer in the control unit, which may be located in a trunk of the car. The system of this embodiment preferably includes a serial link 506 for transferring music data from the CD-ROM drive to the hard disk 120 in the control unit 214. The CD-ROM drive 504 has a feeder type mechanism and can be configured to support CD-R, DVD, CD-RW, CDDA, and CD3™.

Figure 6:
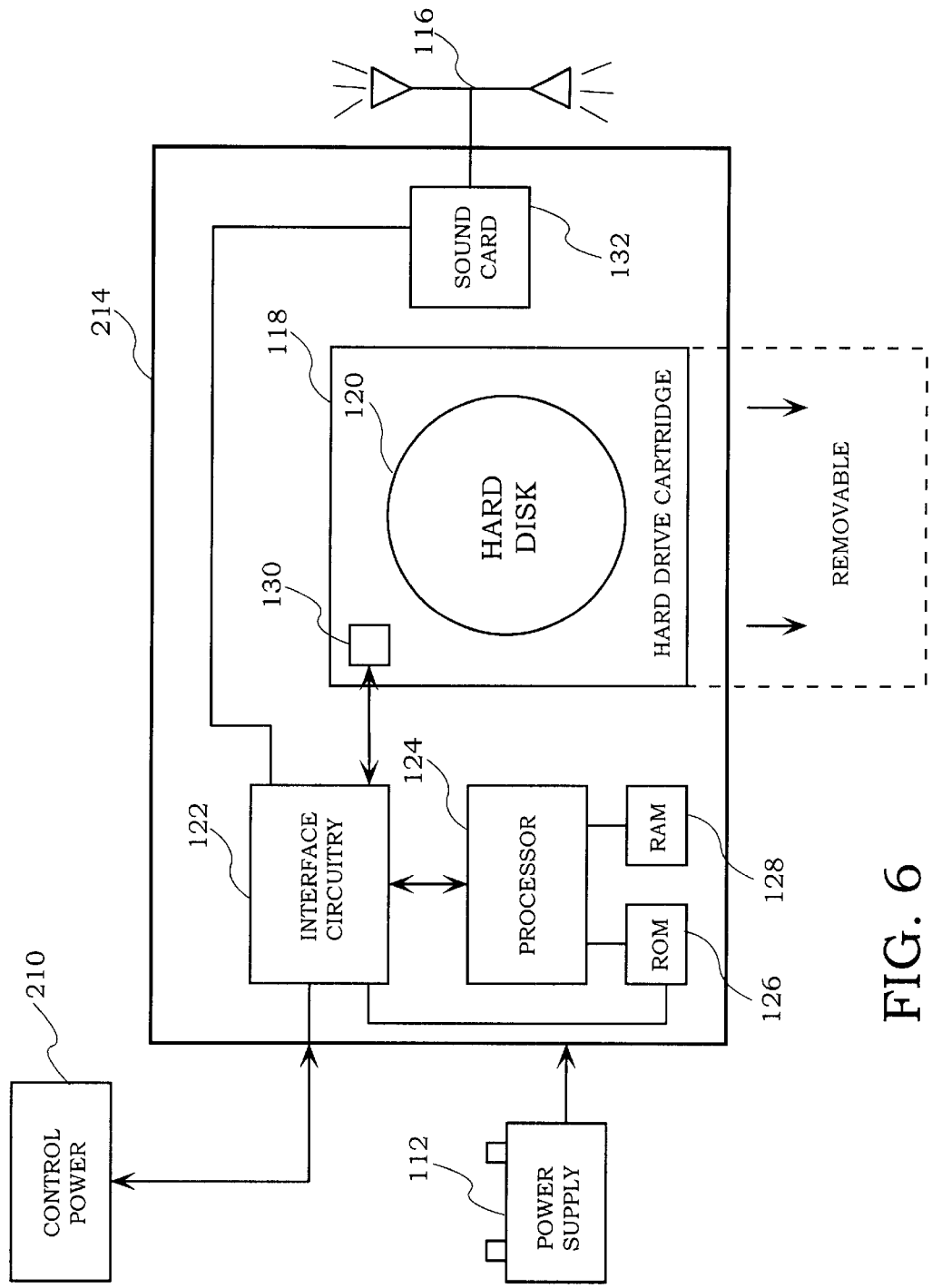
FIG. 6 shows a more detailed view of the control unit of FIG. 5, in accordance with one embodiment of the invention.

FIG. 6 shows a more detailed view of the control unit 214 of FIG. 5, in accordance with one embodiment of the invention. The control unit 214 of FIG. 5 is similar to the control unit 114 of FIG. 3, but without the CD changer. As discussed above with reference to FIG. 5, incorporating the CD-ROM drive into the control panel 210 replaces the need for a CD changer in the control unit 214.

Figure 7:
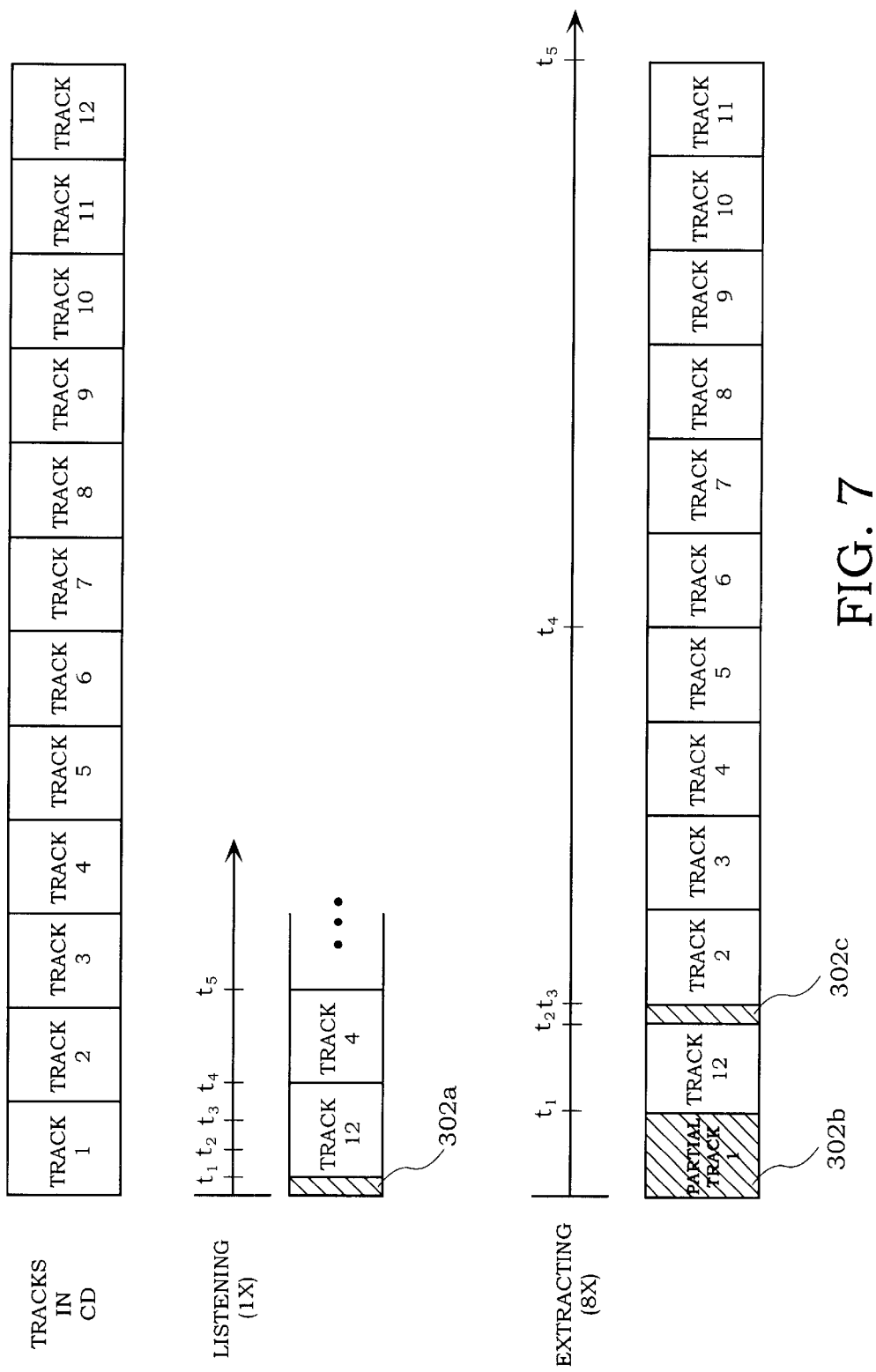
FIG. 7 shows how the system extracts data from a CD having 12 tracks while a user listens to the CD, in accordance with one embodiment of the present invention.

FIG. 7 illustrates how the system extracts data from a CD having 12 tracks while a user listens to the CD, in accordance with one embodiment of the present invention. It should be apparent to one of ordinary skill in the art that in order for the user to listen to the CD, the system is configured to simultaneously playback the CD. In other words, listening is synonymous with playback. Assume each track is about 3 minutes long. FIG. 7 shows a comparison of a listening timeline versus its respective extracting timeline. Both the timelines start at $t_0$ and end at $t_5$. At $t_0$, a user begins listening to track-1. Simultaneously, the system begins extracting data from track-1 and sending the data to a storage media 402, which is depicted in FIG. 8.

Figure 8:
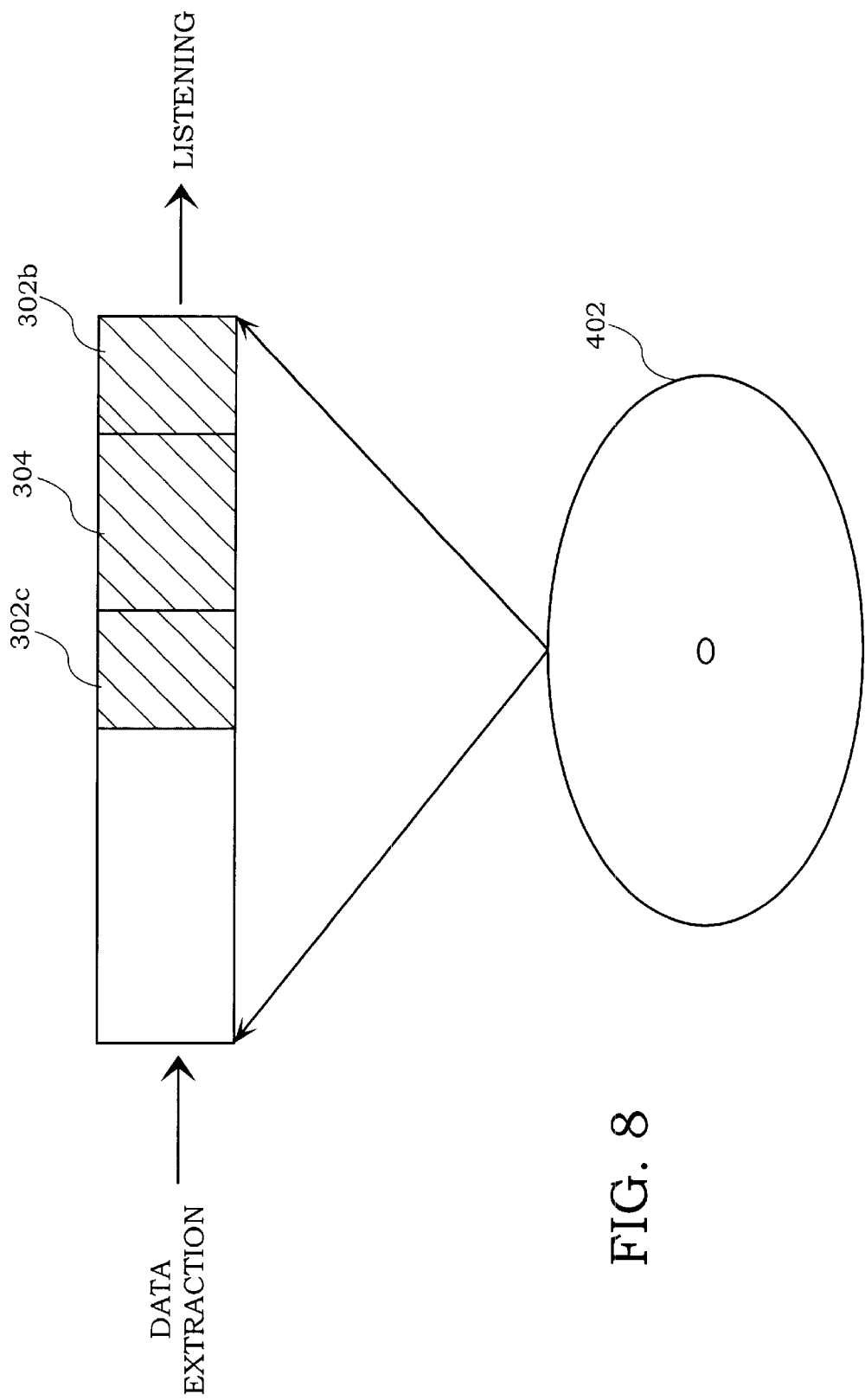
FIG. 8 shows how music for listening comes directly from a storage media, in accordance with one embodiment of the present invention.

As shown in FIG. 8, music for listening comes directly from the storage media 402. Using this extraction technique, the storage media 402 is both the data buffer for playback and the storage for the CD contents. In this embodiment, the storage media 402 is preferably a hard disk 120. In other embodiments, the storage media 402 can be an optical storage media, such as a CD recordable (CD-R) or a CD rewritable (CD-RW). In such a case, the optical storage media can be embodied in the form of a peripheral device. As is well known, peripheral devices can either be internal or external to the personal computer system 115.

Returning to the discussion of FIG. 7, at $t_1$, the user stops listening to track-1 and decides to skip to track-12. Simultaneously, the system stops extracting track-1 and begins extracting track-12. Because the extraction rate is substantially faster than the listening rate, the system has already extracted a major part of track-1. At $t_2$, the user may be ⅛ into listening to track-12. Simultaneously, the system finishes extracting track-12 because the system extracts, in this example, at 8 times the speed of playback. The system also continues to extract the rest of track-1 up to $t_3$, while the user is still listening to track-12. When the system finishes extracting track-1, it begins to extract track-2 and completes extraction up to track-5. At $t_4$, the user finishes listening to track-1 2 and decides to skip to track-4.

As mentioned above, because the system has finished extracting track-1 through track-5, the system will begin extracting track-6. Playback of track 4 will be done from the hard disk because, by this time, the data of track 4 has already been extracted. In this example, between $t_1$ and $t_4$, the system has extracted about half the CD because it may take the system about 6 minutes to extract an entire CD and track-12 may be about 3 minutes long. At $t_5$, the user finishes listening to track-4. Simultaneously, the system has finished extracting track-6 through track-11. At this point, the entire CD has been extracted from the CD media and stored into the storage media 402.

With the aforementioned extraction system, a user can, for example, buy a CD at the store and have it stored in the storage media 402 in the user's car before the user arrives at home by simply listening to a few songs on the system. As such, the user will probably not have a need to input the same CD into the system ever again. Once the CD data is stored into the storage media 402, the system also supports deletion of specific tracks, entire sets of tracks of a CD or an entire CD. The user, for example, has the option of deleting undesirable songs or freeing up storage space for other music. The control panel 110 also has a user-friendly interface that provides fast and easy access to the music.

FIG. 9 illustrates how the system can extract data from a CD having 12 tracks while a user listens to initial portions of tracks 1 through 11, in accordance with one embodiment of the present invention. Assume each track is about 3 minutes long. The listening and skipping combination of FIG. 9 is for the purpose of demonstrating how the system may perform multiple partial extractions. It should be apparent to one of ordinary skill in the art that other listening and skipping combinations, too numerous to describe individually, are also enabled by this disclosure.

As shown in FIG. 9, a listening timeline is compared to its respective extracting timeline, in accordance with one embodiment of the present invention. Both the timelines start at $t_0$ and end at $t_{12}$. At $t_0$ a user begins listening to track-1. Simultaneously, the system begins extracting data from track-1 and sending the data to a storage media 402.

At $t_1$, the user stops listening to track-1 and decides to skip to track-2. Simultaneously, the system stops extracting track-I and begins extracting track-2. Because the extraction rate is substantially faster than the listening rate, the system has already extracted a major part of track-1. At $t_2$, the user stops listening to track-2 and decides to skip to track-3. Simultaneously, the system stops extracting track-2 and begins extracting track-3. This cycle continues until the user has skipped through tracks 1 through 11 and decides to skip: to track-12. At $t_{11}$, the system stops extracting track-11 and begins extracting track-12.

While the user is listening to track-12, the system completes the extraction of track-12 well before the user is finished listening to track-12 because the extraction rate, in this example, is 8 times faster than the listening rate. The system then continues to extract the remainders of tracks 1 through 11, while the user is still listening to track-12. At $t_{12}$, the user finishes listening to track-12, and the entire contents of the CD have been extracted and written to the storage media 402. It is important to note that playback can be performed directly from the storage media 402 because the extraction rate is faster than the playback rate. Thus, the CD data to which the user is listening has already been previously extracted from the CD and written to the storage media 402.

Figure 10:
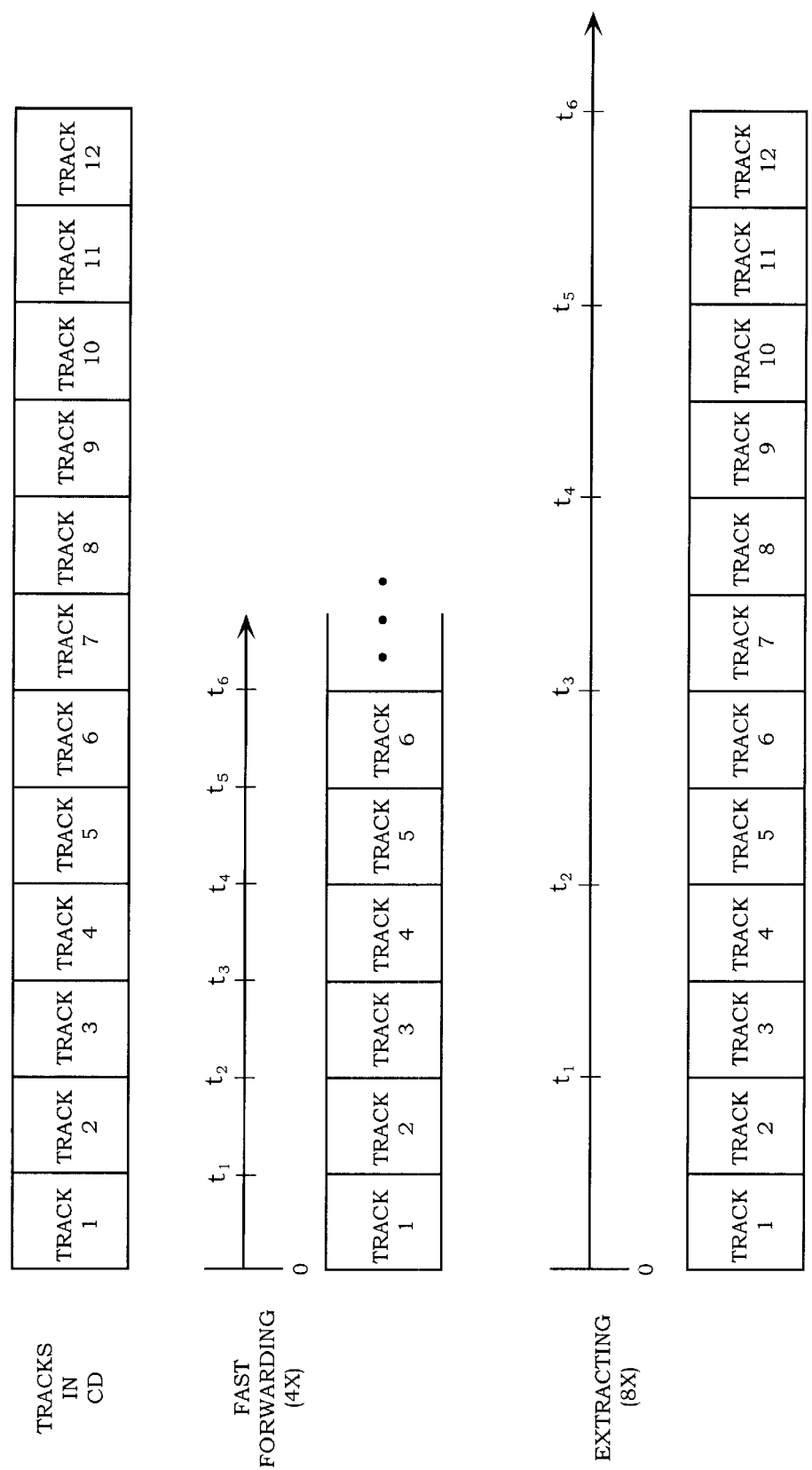
FIG. 10 shows how the system extracts data from a CD having 12 tracks while a user fast forwards through tracks 1 through 6, in accordance with one embodiment of the present invention.

FIG. 10 illustrates how the system extracts data from a CD having 12 tracks while a user fast forwards through tracks 1 through 6, in accordance with one embodiment of the present. invention. This fast forwarding illustration is for demonstration purposes. In other words, this illustration is primarily for the purpose of showing how the system may extract CD data while fast forwarding through CD data.

At $t_0$, a user begins to fast forward through track-1. At $t_1$, the user finishes fast forwarding through track-1 and begins fast forwarding through track-2. The system has extracted all of track-1 and all of track-2 because, in this example, the extracting rate is 2 times faster than the fast forwarding rate. The cycle continues until the user fast forwards to the end of track-6. At $t_6$, the entire contents of the CD have been extracted.

As shown in FIG. 10, the extracting rate is 8× while the fast forwarding rate is 4×. It should be apparent to one of ordinary skill in the art, however, that the extracting rate and fast forwarding rate can be any speed, preferably as long as the extracting rate is higher than the fast forwarding rate. In a similar manner, configuring the system such that the extracting rate is higher than the listening rate ensures that CD data is extracted before the CD data is listened to or otherwise played back.

Figure 11:
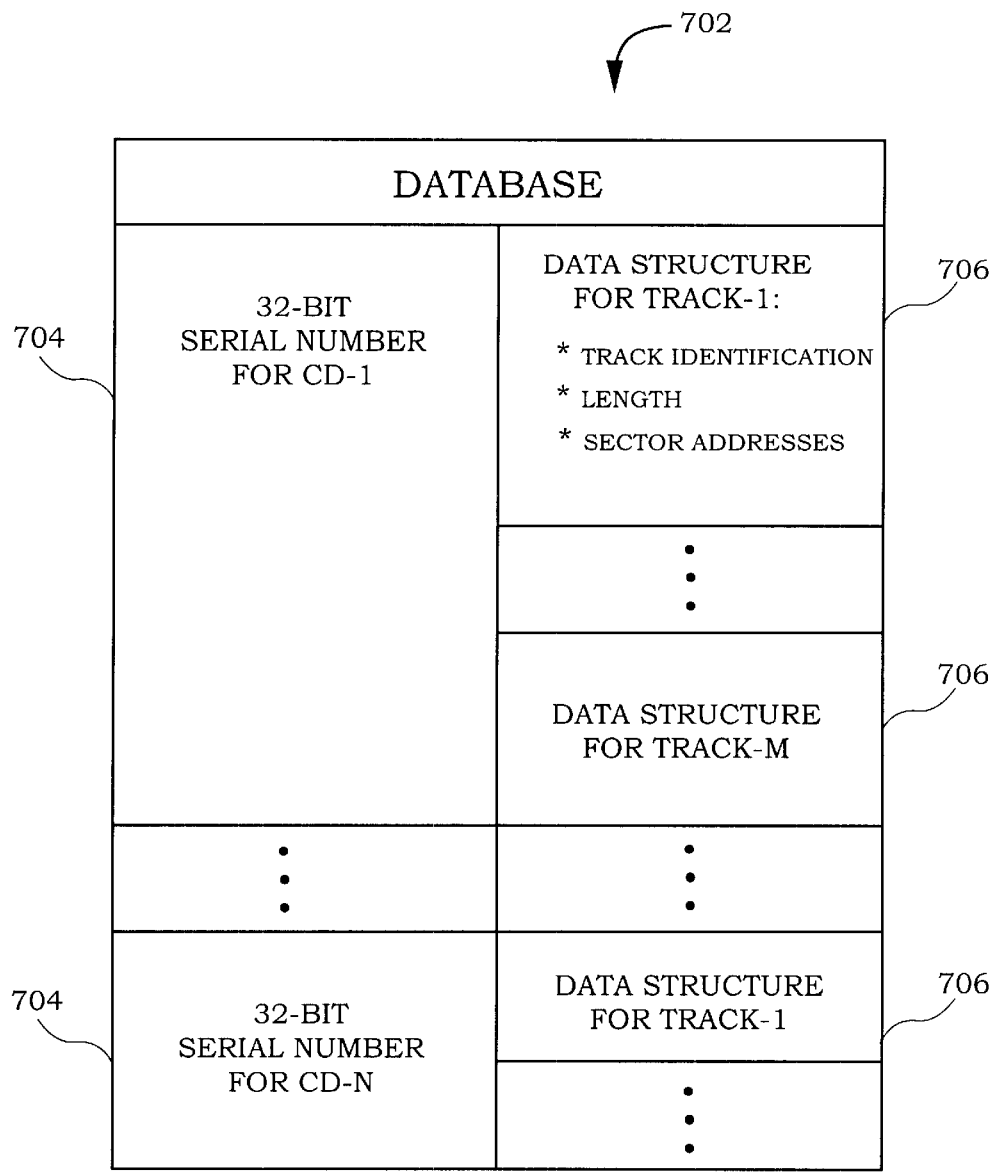
FIG. 11 shows how music data that is extracted from a CD may be organized into a database, in accordance with one embodiment of the present invention.

FIG. 11 shows how music data that is extracted from a CD may be organized into a database 702, in accordance with one embodiment of the present invention. When music data is extracted from the CD, the system preferably generates a database that has CD fields 704 for identifying each CD and track fields 706 for organizing each track on the CD.

The CD field 704 preferably contains a unique 32-bit serial number or some other label that uniquely identifies the CD. The serial number is not actually stored on the music CD itself. The 32-bit serial number is a number that is generated by the system. If a user extracts music data from N CD's, then the database 702 has N CD fields 704. A track field 706 preferably contains a data structure that includes a track identification, a track length, and sector addresses. The track identification is preferably the name of the track. Alternatively, if the music data has CD text, the track may be identified by the track name, the artist's name, and genre (e.g., rock, jazz, etc.). These attributes will be accessible to the user through the control panel 110 to facilitate managing the music data in the database. If the user is using the system by way of a personal computer system, the user can use a number of graphical user interfaces that facilitate the management and organization of the music data.

If a CD has M tracks, then that CD will have M track fields 706 associated with the CD's serial number in the CD field 704. In this embodiment, the sector addresses are provided in the database itself. By providing the sector addresses in the database, the system does not need a separate file system for organizing the music data for each track. Such an alternative embodiment is described below with reference to FIG. 12.

Figure 12A:
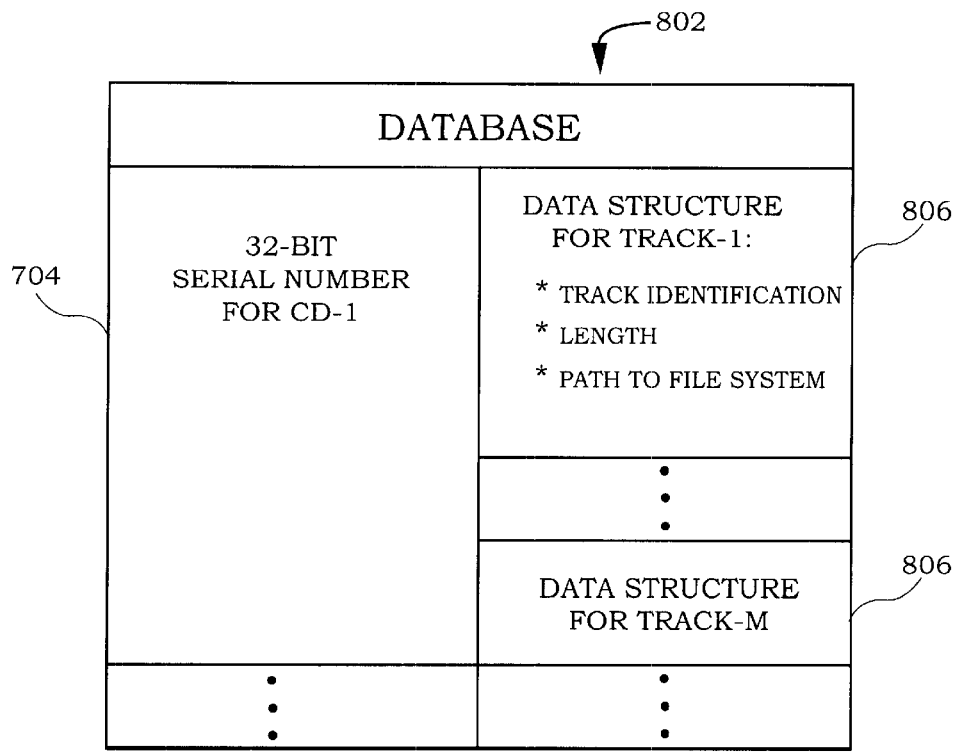
FIGS. 12A shows how music data that is extracted from a CD may be organized into a database and how that database may refer to a file system in FIG. 12B, in accordance with one embodiment of the present invention.
Figure 12B:
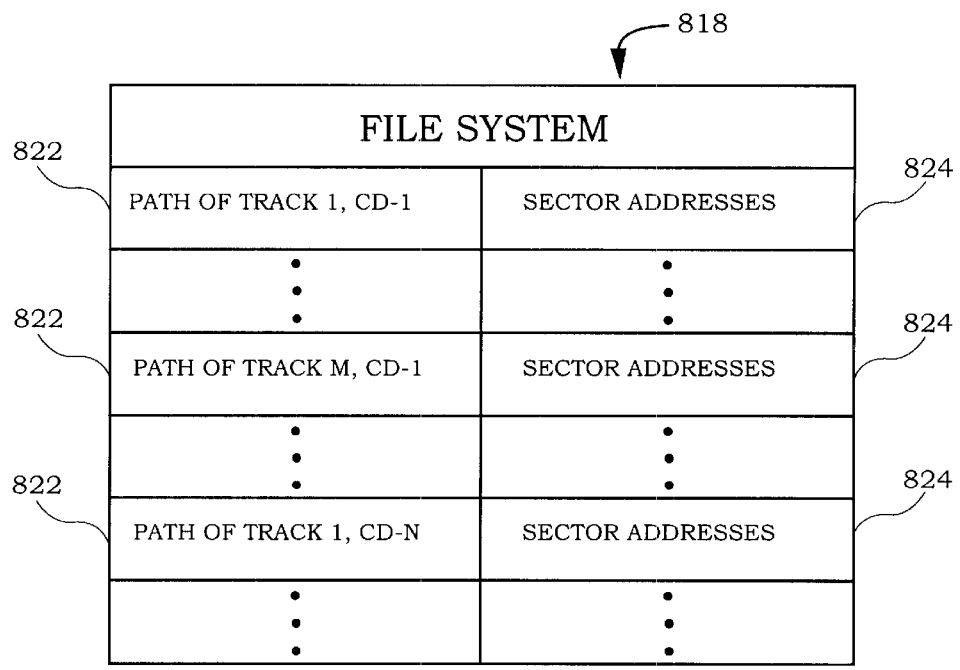
FIG. 12B shows the file system that is being referenced by the database of FIG. 12A, in accordance with one embodiment of the present invention.

FIGS. 12A and 12B show how music data that is extracted from a CD may be organized into a database 802 and a file system 818, in accordance with one embodiment of the present invention. When music data is extracted from the CD, the system preferably generates a database that has CD fields 704 for identifying each CD and track fields 806 for organizing each track on the CD. The system also generates a file system 818 that is used specifically for organizing the music data extracted from the tracks on the CD.

The CD field 704 preferably contains a 32-bit serial number or some other label which uniquely identifies the CD. If a user extracts music data from N CD's, then the database 802 has N CD fields 704. A track field 806 preferably contains a data structure that includes a track identification, a track length, and a path to a location in the file system. If a CD has M tracks, then that CD will have M track fields 806 associated with the serial number in the CD field 704.

In this embodiment, sector addresses are provided in a sector field 824 in a separate file system 818. The track field 806 provides a path to the file system 818, and that path is also contained in: a track path field 822 of the file system 818. For a CD having M tracks, that CD will have M track path fields 822 in the file system 818. Sectors addresses in the sector field 824 will be associated with that track path in the track path field 822.

One example of a file system is a FAT 32™ file system, which is used by the Microsoft Windows™ operating system. Another example of a file system is CD3™ Tm file system developed by Adaptec, Inc. For more information on CD3™ files systems, reference can be made to a U.S. provisional patent application, having Application No. 60/139,921, filed on Jun. 17, 1999, entitled "PHYSICAL FORMAT, VOLUME AND FILE STRUCTURE, AND RECORDING AND READING COMPRESSED AUDIO." This application is hereby incorporated by reference and 35 U.S.C. §119(e) priority is claimed herein.

Regardless of the file system used, however, the file system preferably allows music data to be stored in a somewhat discontiguous manner. In other words, the file system should allow for sectors to be scattered throughout different locations on the hard disk. Because of the extraction technique used by the present invention, if a user is skipping around to various tracks on a CD, music data for one particular track probably will not be written to the hard disk 120 in one contiguous block. Rather, a portion of the music data will be extracted and written to the hard disk 120 as the user is listening to a portion of the track. If the user skips to a different track, the system will likewise skip and begin extracting and writing the track to which the user has skipped. However, the storage media behaves as both the data buffer and the storage device. Thus, although an entire track will eventually be extracted from a CD, the music data for that track can be scattered throughout different sectors on the hard disk. With such scattering of music data on the hard disk, it is therefore important to have a file system (or database) that allows for somewhat discontiguous file storage.

Figure 13:
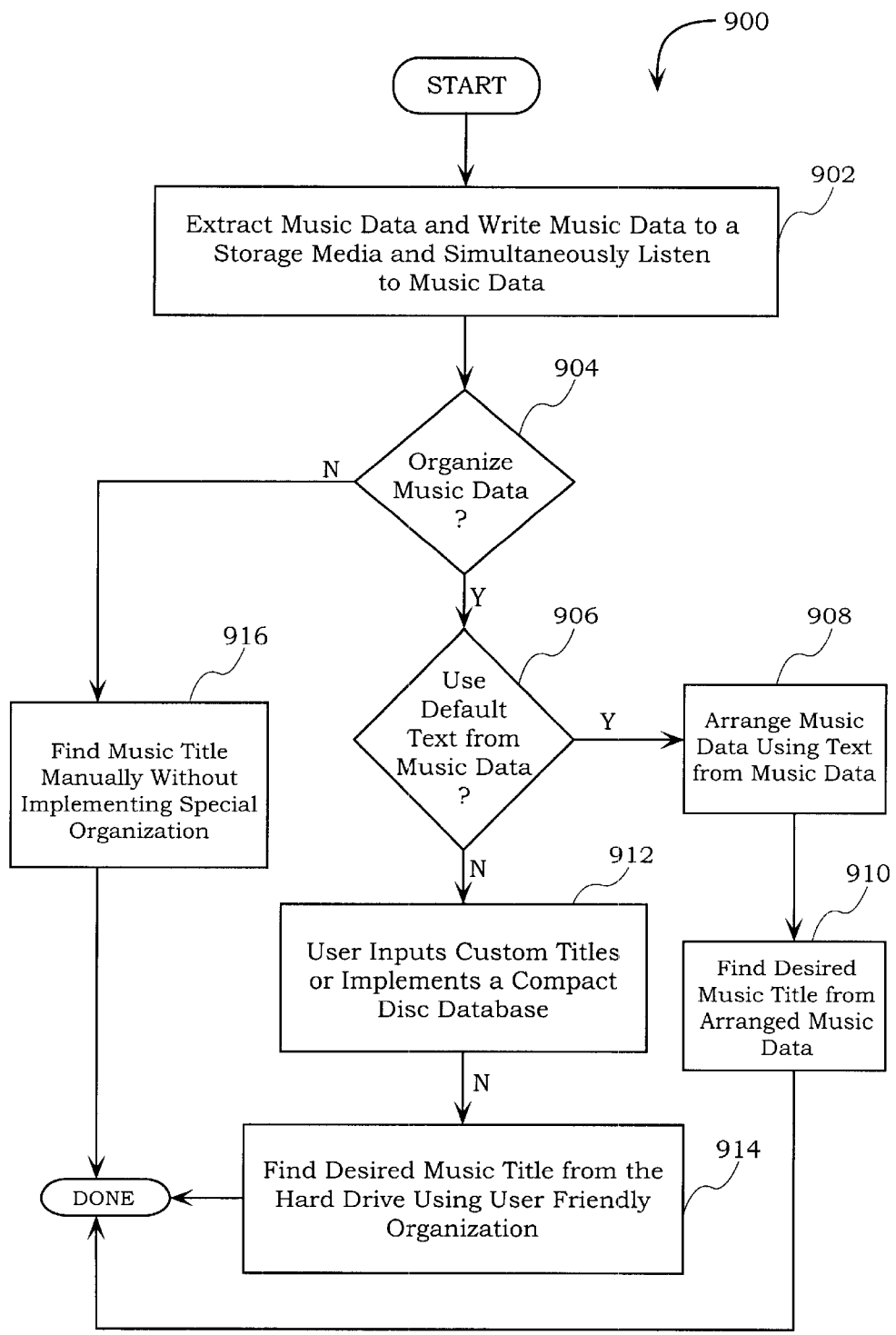
FIG. 13 shows a flowchart of a method that provides the ability to manage music data, in accordance with one embodiment of the present invention.

FIG. 13 shows a flowchart of the method 900 illustrating how the system provides the ability to manage music data for a multitude of CD's, in accordance with one embodiment of the present invention. The method starts at operation 902 where the system extracts music data from a CD, writes the music data to a storage media, and the user simultaneously listens to. the music data. Operation 902 is explained in greater detail below with reference to FIG. 14. At this point, the storage media has sufficient music data to begin organizing the music data in the database and, if utilized, the file system.

The method proceeds to a decision operation 904 where it is determined whether the user would like to organize the CD data. If the user would not like to organize the CD data, the method moves to operation 916 where the user finds the desired music title manually without implementing a special organization scheme. The method is then done.

On the other hand, if the user does want to organize the CD data, the method moves to another decision operation 906 where it is determined whether the user would like to use default text from the CD data. If the user does not want to use default text, the method moves to an operation 912 where the user may input custom titles or a prearranged compact disc database. The method then proceeds to operation 914 where the user finds the desired music title from the hard drive utilizing user-friendly organization and controls. The method is then done.

If, however, in decision operation 906 the user does want to use default text from the music data, the method moves to operation 908 where the user may arrange music data using text from the music data. The method then proceeds to operation 910 where the user can find a desired music title from the arranged CD data. The method is then done.

In arranging the CD's, the user may sort the CD's by type, artist, title, etc. The users may also create their own category. The system provides shuffling or continuation features based on category. In other embodiments, the user can also program a set of music titles that may be sequentially played during an automobile trip, for example.

The system can also include a unidirectional playback path from the control unit 114 to the sound system 116. The purpose of such a feature is to prevent the user from making extra copies of a CD after the CD has been recorded onto hard disk 120. The system can also include a bootable CD for system recovery, for example, if the hard drive is damaged, replaced or upgraded. The system can also include hardware auto-reset in case the system crashes. In one embodiment, the BIOS can notify the user of system failure. A ROM BIOS can also be programmed to handle boot-up, system recovery, and diagnostics.

For CD-R and CD-RW users, the system allows a user to play CD-R and CD-RW audio discs. In the case where CD data is stored to an optical storage media, the system can be designed to play and cache the CD data in Adaptec's CD3™ Format. In yet another embodiment, the system can be configured to enable synchronization of the music track title database. In addition, the system is designed to allow a user to download Internet music or content and then play it on the system.

Figure 14:
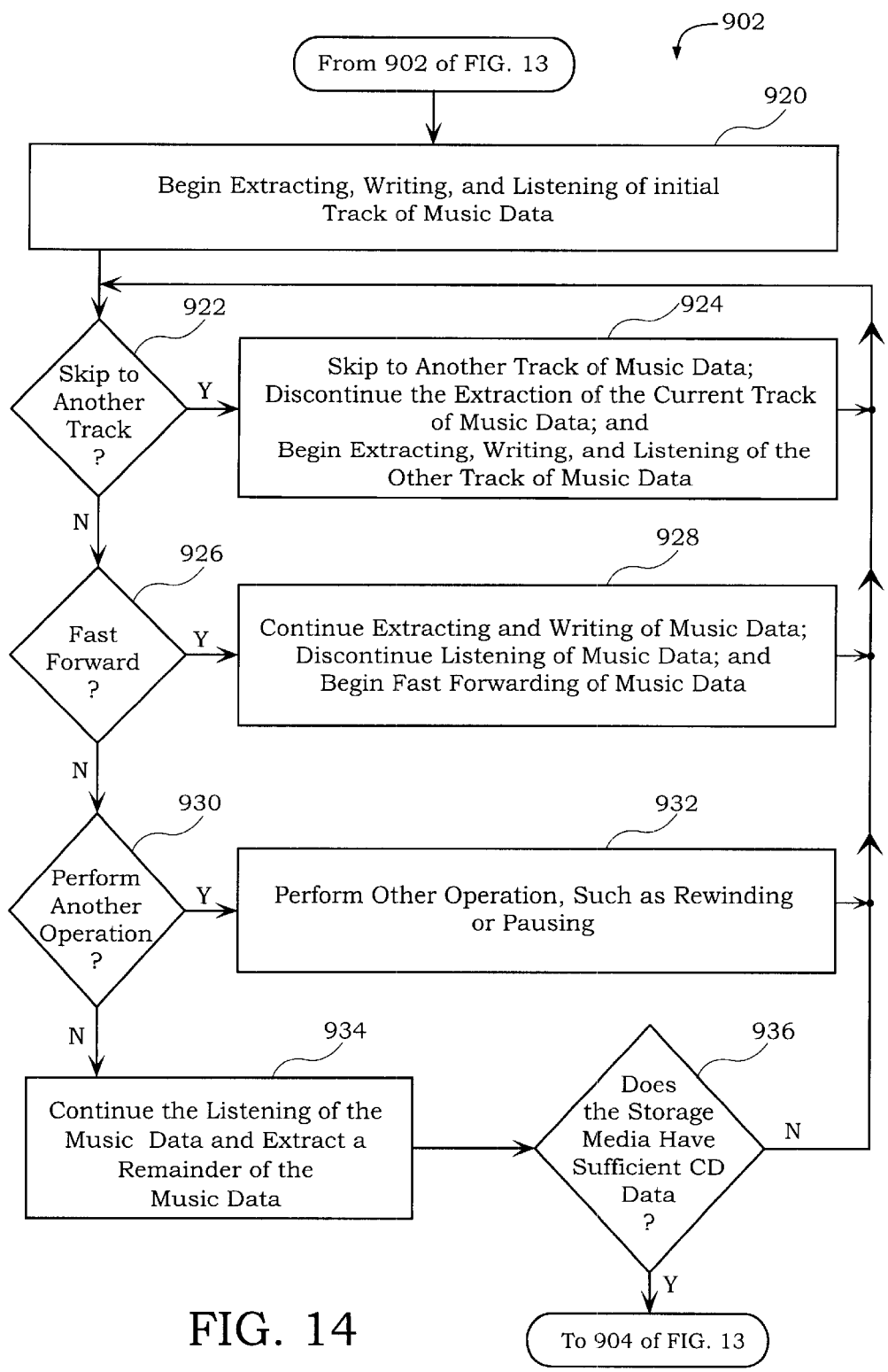
FIG. 14 shows a more detailed flowchart of an operation of FIG. 13, in accordance with one embodiment of the present invention.

FIG. 14 shows a more detailed flowchart of operation 902 of FIG. 13, in accordance with one embodiment of the present invention. The method proceeds to operation 920 where the system begins extracting music data from a CD and begins writing to a storage media. Simultaneously, the user can begin to listen to the initial track of music data that is being extracted. The user here is preferably listening to the music data directly from the storage media. As explained above with reference to FIG. 8, the listening rate is substantially slower than the extracting rate. Thus, the music data that the user is listening to is already on the storage media.

During the time that the system is extracting and the user is listening, the method provides a series of decision operations 922, 926 and 930, where the user may decide to skip to another track, fast forward, or perform some other operation. If the user decides to skip to another track in decision operation 922, the method moves to operation 924 where the system skips to the other track and discontinues the extraction of the current track of music data. The system also begins to extract the other track from the CD and begins to write the other track to the storage media. Simultaneously, the user begins to listen to the other track of music data that is being extracted.

If the user decides to fast forward in decision operation 926, the method then moves to operation 928 where the system continues the extracting and the writing of music data. Also, the user discontinues the listening of the music data, and the system begins fast forwarding the music data that was just previously being listened to by the user.

If the user decides to perform some other operation in decision operation 930, the method moves to operation 932 where the other operation may be performed on the music data. The other operation may be, for example, rewinding, pausing, etc.

If the user is not presently performing any operations on the music data, the method moves to operation 934 where the user continues to listen to music data, and the system continues to extract a remainder of the music data. Following operation 934, the method proceeds to decision operation 936, where it is determined if sufficient CD data has been extracted from the CD to begin organizing the music data in the database and, if utilized, the file system. If there is sufficient music data, the method moves to decision operation 904 of FIG. 13. If, however, more music data needs to be extracted, the method provides a series of decision operations 922, 926 and 930, where the user may decide to skip to another track, fast forward, or perform some other operation. The foregoing cycle continues until the storage media contains sufficient CD data to be organized.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of extracting music data from a compact disc, comprising:

extracting at least a portion of an initial track of music data at an extracting rate that is greater than a listening rate;

recording the extracted portion of the initial track of music data to a storage media at the extracting rate while continuing the extracting;

allowing the listening to at least a portion of the extracted portion of the initial track of music data from the storage media at the listening rate while continuing the extracting and the recording;

skipping to a second track of music data of the compact disc before the initial track of music data is completely extracted and recorded to the storage media;

discontinuing the extraction of the initial track of music data;

extracting at least a portion of the second track of music data;

recording the extracted portion of the second track of music data to the storage media; and allowing the listening to at least a portion of the extracted portion of the second track of music data, wherein the storage media includes a hard disk storage media and an optical storage media.

2. A method of extracting music data from a compact disc as recited in claim 1, further comprising:

continuing to allow the listening to the extracted portion of the second track of music data from the storage media; and extracting a remainder of the second track of music data, the initial track of music data and additional tracks of music data past the second track of music data that was extracted while continuing to allow the listening to the extracted portion of the second track.

3. A computer readable media having program instructions for extracting music data from a compact disc, comprising:

instructions for extracting at least a portion of an initial track of music data at an extracting rate that is greater than a play back rate;

instructions for recording at least the portion of the initial track of music data to a storage media at the extracting rate while performing the extracting;

instructions for playing back at least the portion of the initial track of music data from the storage media at the play back rate while continuing the extracting and the recording;

instructions for skipping to a second track of music data of the compact disc before the initial track of music data is completely extracted and recorded to the storage media;

instructions for discontinuing the extraction of the initial track of music data;

instructions for extracting at least a portion of the second track of music data;

instructions for recording the extracted portion of the second track of music data to the storage media; and instructions for playing back at least a portion of the extracted portion of the second track of music data, wherein the storage media includes a hard disk storage media and an optical storage media.

4. A computer readable media having program instructions for extracting music data from a compact disc as recited in claim 3, the program instructions comprising:

instructions for continuing to play back the extracted portion of the second track of music data from the storage media; and instructions for extracting a remainder of the second track of music data, the initial track of music data and additional tracks of music data past the second track of music data that was extracted while continuing to play back the extracted portion of the second track.

5. A method for managing audio data capable of being executed using a computing system, the method comprising:

program instructions for extracting at least a portion of an initial track of audio data from a compact disc at an extracting rate, the extracting rate being faster than a listening rate;

program instructions for recording the extracted portion of an initial track of audio data to a storage media at the extracting rate while continuing the extracting; and program instructions for allowing the listening to at least a portion of the extracted portion of an initial track of audio data from the storage media at the listening rate while continuing the extracting and the recording, wherein the storage media includes a hard disk storage media and an optical storage media.

6. A method for managing audio data capable of being executed using a computing system as recited in claim 5, the method further comprising:

program instructions for providing for the organizing of the recorded at least a portion of an initial track of audio data on the storage media.

7. A computer readable media having program instructions for managing audio data, comprising:

program instructions for extracting at least a portion of an initial track of audio data from a compact disc at an extracting rate, the extracting rate being faster than a listening rate;

program instructions for recording the extracted portion of the initial track of audio data to a storage media at the extracting rate while continuing the extracting; and program instructions for allowing the listening to at least a portion of the extracted portion of an initial track of audio data from the storage media at the listening rate while continuing the extracting and the recording wherein the storage media includes a hard disk storage media and an optical storage media.

8. A computer readable media having program instructions for managing audio data as recited in claim 7, further comprising:

program instructions for completing the extraction of at least one complete track of audio data; and program instructions for organizing the at least one complete track of audio data stored on the storage media.

* * * * *